United States Patent [19]

Usami et al.

[11] Patent Number: 5,244,774

[45] Date of Patent: Sep. 14, 1993

[54] OPTICAL INFORMATION RECORDING MEDIUM

[75] Inventors: Yoshihisa Usami; Takashi Kobayashi, both of Shizuoka; Ken Kawata; Yoshio Inagaki, both of Kanagawa, all of Japan

[73] Assignee: Fuji Photo Film Co., Ltd., Kanagawa, Japan

[21] Appl. No.: 687,800

[22] Filed: Apr. 19, 1991

[30] Foreign Application Priority Data

Apr. 19, 1990 [JP] Japan .................. 2-103757
Nov. 5, 1990 [JP] Japan .................. 2-297261

[51] Int. Cl.$^5$ .............................................. G11B 7/24
[52] U.S. Cl. .................................. 430/271; 430/495; 430/945; 346/135.1; 369/286
[58] Field of Search ............ 430/271, 945, 495; 369/286, 288; 346/135.1

[56] References Cited

U.S. PATENT DOCUMENTS

| | | | |
|---|---|---|---|
| 4,696,892 | 9/1987 | Abe et al. | 430/495 |
| 4,740,447 | 4/1988 | Itoh | 430/270 |
| 4,944,967 | 7/1990 | Yabe et al. | 427/393.5 |
| 5,002,812 | 3/1991 | Umehara et al. | 428/64 |
| 5,080,946 | 1/1992 | Takagisi et al. | 428/64 |
| 5,155,723 | 10/1992 | Hamada et al. | 369/284 |

Primary Examiner—Charles L. Bowers, Jr.
Assistant Examiner—John A. McPherson
Attorney, Agent, or Firm—Sughrue, Mion, Zinn, Macpeak & Seas

[57] ABSTRACT

Disclosed is an optical information recording medium comprising a substrate, a first recording layer, a second recording layer and a third recording layer, superposed in this order. Each of the first, second and third recording layers is made of an organic material, and has such a specific real part of a complex refractive index and an imaginary part thereof that the resulting recording medium shows a high reflectance.

2 Claims, 1 Drawing Sheet

OPTICAL INFORMATION RECORDING MEDIUM

BACKGROUND OF THE INVENTION

1. Field of the Invention

The present invention relates to an optical information recording medium for recording information by means of a laser beam having a high energy density.

2. Description of Prior Art

Information recording media for recording or reproducing information by the use of a laser beam of high energy density (i.e., optical information recording media) have been developed in recent years and are put into practical use. Such recording media are generally referred to as "optical discs" and have been widely utilized in various fields, for example, as an optical disc such as a video disc and an audio disc as well as a disc memory for a large-capacity computer and a large-capacity static image file, a micro-image recording medium, an ultramicro-image recording medium, a micro-facsimile, and an optical card.

As for the video disc or audio disc (i.e., compact disc or CD), optical discs for only reproducing information have been already put into practical use, and optical discs of DRAW-type (Direct Read After Write-type) for recording information have been also developed and partially put into practical use.

The information recording medium of DRAW-type basically comprises a disc-shaped substrate made of a plastic material or a glass material and a recording layer made of a metal such as Bi, Sn, In and Te or a semimetal which is provided on the substrate. Writing (i.e., recording) of information on the optical disc can be carried out by irradiating the disc with a laser beam. The irradiated area of the recording layer of the optical disc absorbs energy of the laser beam and rise of temperature locally occurs, and as a result, a chemical or physical change (e.g., formation of pits) is caused to alter (or change) optical characteristics of the recording layer in the irradiated area, whereby information is recorded on the recording layer. Reading (i.e., reproduction) of information from the optical disc is also carried out by irradiating the disc with a laser beam, that is, the recorded information is reproduced by detecting a reflected light or a transmitted light corresponding to the change in the optical characteristics of the recording layer. The irradiation of the optical disc with the laser beam for writing and reading information is generally conducted on the pre-determined part of the disc surface. In order to guide the laser beam to accurately trace the pre-determined irradiation part (generally referred to as "tracking"), the surface of the optical disc is provided with a pre-groove of inverse-trapezoidal shape or other shape (i.e., tracking guide). Further, on the inner periphery side of the optical disc is generally formed pre-pits indicating pre-format information, such as address information, required for recording of signals.

As described above, the information recording medium of DRAW-type has a basic structure comprising a substrate, which is provided with a pre-groove and optionally provided with pre-pits, and a recording layer provided on the substrate.

As a material (i.e., recording material) for forming the recording layer of the information recording medium, the above-mentioned metals and dyes are generally known. An information recording medium using a dye as a recording material has such an advantageous feature in productivity that the recording layer can be easily formed on the substrate by a conventional coating method. Some metals or dyes among various recording materials for optical discs are known to be useful because of their high sensitivities, but optical discs using those metals or dyes show the reflectance of only 30 to 40%. Hence, a recording layer made of a dye generally has a drawback of low reflectance.

On the conventional information recording media of DRAW-type (optical discs of DRAW-type), information is generally recorded at a high linear speed, but a particularly high reflectance is not required therefor. On the other hand, compact discs of DRAW-type (CD-DRAW) on which information is recorded at a low linear speed using CD format signals requires a high reflectance. CD-DRAW having the high reflectance has such an advantage that the information recorded on the CD-DRAW can be reproduced using a commercially available CD player. The commercially available CD player is widely used as a reproducing player for CD having been recorded with music as information.

As a method of enhancing a reflectance, Japanese Patent Provisional Publication No. 1(1989)-242287 discloses a method of forming a dye recording layer using imidazoquinoxaline dyes, whereby a high reflectance can be obtained. However, when the signals recorded on the dye recording layer is reproduced using a laser beam, the reproduction characteristics are not sufficiently satisfactory. Moreover, the dye recording layer also has other problem that a read-error may occur with time in the reproduction stage.

An information recording medium which is provided with a metal reflecting layer on the dye recording layer to improve a reflectance is described in "Nikkei Electronics", p. 107, Jan. 23, 1989. In this information recording medium, as the dye recording layer absorbs a laser beam to melt the dye of the recording layer, the plastic substrate is heated and protruded on the dye recording layer side to form pits on the substrate.

European Patent Publication Numbers EP 0353393 A2 and EP 0353394 A2 disclose that an enhancing layer is provided between a dye recording layer and a metal reflecting layer to enhance a reflectance. As materials of the enhancing layer, inorganic materials such as SiO, $SiO_2$, $Si_3N_4$ and AlN are described.

In both of the former case (case of providing a reflecting layer on a dye recording layer) and the latter case (case of providing an enhancing layer and a reflecting layer on a dye recording layer) for improving a reflectance, the dye recording layer can be easily formed by a conventional coating method, while the reflecting layer and the enhancing layer are required to be formed utilizing a deposition method such as sputtering. Hence not only the cost becomes high because of the use of an expensive apparatus, but also the formation of those layers is time-consuming. The provision of the enhancing layer or the reflecting layer, therefore, results in disadvantages in the production.

In CD-DRAW, pre-format information such as address information required for recording signals is generally recorded by forming pre-pits on the inner periphery side of a substrate in the molding procedure of the substrate. However, in the case of providing a metal reflecting layer on a dye recording layer, the pre-pit signals become extremely small, and such small signals can be hardly reproduced. For this reason, it is impossible to provide a dye recording layer on the pre-pit area, and hence the production of optical discs is obliged to be complicated.

SUMMARY OF THE INVENTION

It is an object of the present invention to provide a novel optical information recording medium which can be obtained by a conventional simple coating method and shows a high reflectance.

It is another object of the invention to provide a novel optical information recording medium which shows a high reflectance of not lower than 60% within a wide wavelength region of not less than 100 nm.

It is a further object of the invention to provide an optical information recording medium having the same layer-structure on both the pre-pit area and the recording area from which signals of the pre-pit area can be accurately read out.

It is a still further object of the invention to provide an optical information recording medium on which long pit signals can be recorded with little distortion.

There is provided by the invention an optical information recording medium comprising a substrate, a first recording layer, a second recording layer and a third recording layer, superposed in this order, wherein:

the first recording layer is made of an organic material and satisfies the following conditions (1) and (2):

$$n_{1r} \geq 1.8 \quad (1)$$

$$k_{1r} \leq 0.5 \quad (2)$$

the second recording layer is made of an organic material and satisfies the following conditions (3) and (4):

$$n_{2r} < 1.8 \quad (3)$$

$$k_{2r} \leq 0.5 \quad (4)$$

and the third recording layer is made of an organic material and satisfies the following conditions (5) and (6) or the condition (7):

$$n_{3r} \geq 1.8 \quad (5)$$

$$k_{3r} \leq 0.5 \quad (6)$$

$$k_{3r} \geq 1 \quad (7)$$

wherein $n_{1r}$, $n_{2r}$, and $n_{3r}$ represent a real part of a complex refractive index of the first recording layer, that of the second recording layer and that of the third recording layer, respectively, at the wavelength of a reproducing laser beam; and $k_{1r}$, $k_{2r}$ and $k_{3r}$ represent an imaginary part of a complex refractive index of the first recording layer, that of the second recording layer and that of the third recording layer, respectively, at the wavelength of a reproducing laser beam.

Preferred embodiments of the optical information recording medium of the present invention are as follows.

1) The optical information recording medium wherein the third recording layer satisfying the condition (7) further satisfies the following condition (8):

$$n_{3m} + k_{3m} < 5.26 \quad (8)$$

wherein $n_{3m}$ and $k_{3m}$ represent a real part of a complex refractive index of the third recording layer and an imaginary part thereof, respectively, at the maximum absorption wavelength of the third recording layer.

2) The optical information recording medium wherein the third recording layer satisfying the condition (7) further satisfies the following conditions (8) and (9):

$$n_{3m} + k_{3m} < 5.26 \quad (8)$$

$$1 \leq n_{3r} \leq 4 \quad (9)$$

wherein $n_{3m}$ and $k_{3m}$ represent a real part of a complex refractive index of the third recording layer and an imaginary part thereof, respectively, at the maximum absorption wavelength of the third recording layer; and $n_{3r}$ represents a real part of a refractive index of the third recording layer at the wavelength of a reproducing laser beam.

3) The optical information recording medium wherein the third recording layer satisfying the condition (7) further satisfies the following condition (10):

$$n_{3m} + k_{3m} \geq 5.26 \quad (10)$$

wherein $n_{3m}$ and $k_{3m}$ have the same meanings as defined above.

4) The optical information recording medium wherein the third recording layer satisfying the condition (7) further satisfies the following conditions (10), (11) and (12):

$$n_{3m} + k_{3m} \geq 5.26 \quad (10)$$

$$k_{3m} \geq 1.0 \quad (11)$$

$$n_{3r} \leq k_{3r} \quad (12)$$

wherein $n_{3m}$, $k_{3m}$, $n_{3r}$ and $k_{3r}$ have the same meanings as defined above.

5) The optical information recording medium wherein a surface of the substrate is provided with a pre-groove.

6) The optical information recording medium wherein each of the first recording layer and the third recording layer has a thickness of 5 to 100 nm.

7) The optical information recording medium wherein the third recording layer satisfying the conditions (7), (10), (11) and (12) has a thickness of 5 to 40 nm.

8) The optical information recording medium wherein a pre-groove and pre-pits are provided on a surface of the substrate.

9) The optical information recording medium wherein a difference between the real part $n_{1r}$ (refractive index) of the complex refractive index of the first recording layer and the real part $n_{2r}$ (refractive index) of the complex refractive index of the second recording layer is not less than 0.5.

10) The optical information recording medium wherein a difference between the real part $n_{2r}$ of the complex refractive index of the second recording layer and the real part $n_{3r}$ of the complex refractive index of the third recording layer satisfying the conditions (5) and (6) is not less than 0.5.

11) The optical information recording medium wherein the imaginary part (i.e., extinction coefficient, $k_{1r}$, $k_{2r}$, or $k_{3r}$) of the complex refractive index of at least one layer of the first recording layer, the second recording layer and the third recording layer is not less than 0.01.

12) The optical information recording medium wherein each of the organic materials of the first recording layer and the third recording layer is a dye.

13) The optical information recording medium wherein the organic material of the second recording layer is a polymer or a dye.

14) The optical information recording medium wherein the imaginary part ($k_{2r}$) of the complex refractive index of the second recording layer is in the range of 0 to 0.3.

15) The optical information recording medium wherein the organic material of the first recording layer is at least one dye selected from the group consisting of an indolidine dye, an imidazoquinoxaline dye, a thiazol dye, an indolenine dye, a merocyanine dye and a phthalocyanine dye.

16) The optical information recording medium wherein the organic material of the third recording layer is at least one dye selected from the group consisting of an indolidine dye, an imidazoquinoxaline dye, a thiazol dye, an indolenine dye, a merocyanine dye and a phthalocyanine dye.

17) The optical information recording medium wherein the organic material of the second recording layer is a polymer.

18) The optical information recording medium which has a reflectance of not less than 50%.

19) The optical information recording medium which has a reflectance of not less than 60%.

20) The optical information recording medium wherein the pre-groove has a dimension of a half width of 0.2 to 1.0 $\mu$m and a depth of 400 to 4,000 Å.

21) The optical information recording medium wherein a protective layer is provided on the third recording layer.

The present invention is an optical information recording medium having on a substrate at least three recording layers each of which can be easily formed by a coating method and has a specific refractive index and a specific extinction coefficient (real part of a complex refractive index and imaginary part thereof). By adoption of such structure, there can be obtained an optical information recording medium which has a great advantage that the medium can be prepared by a simple and easy process and which additionally has a high reflectance.

Especially in the case that the extinction coefficient of the third recording layer is large, there can be obtained an optical information recording medium showing a high reflectance such as a reflectance of not less than 60% within a wide wavelength region.

Further, the optical information recording medium of the invention can records long pit signals with little distortion as compared with a conventional optical disc which a metal reflecting layer is provided on a recording layer. Other conventional optical disc having a metal reflecting layer provided with pre-pits also has a problem that the pre-pit signals cannot be reproduced when the above layer-structure (a recording layer and a reflecting layer) is provided on both the pre-pit area and the recording area. However, in the case of the optical information recording medium of the invention, the signals of the pre-pits can be accurately read out even when a recording layer of the three-layer structure is provided on both the pre-pit area and the recording area. Accordingly, a recording layer can be formed on the pre-pit area and the recording area at the same time, and hence an optical disc having pre-pits can be easily prepared.

DETAILED DESCRIPTION OF THE INVENTION

Figure 1:
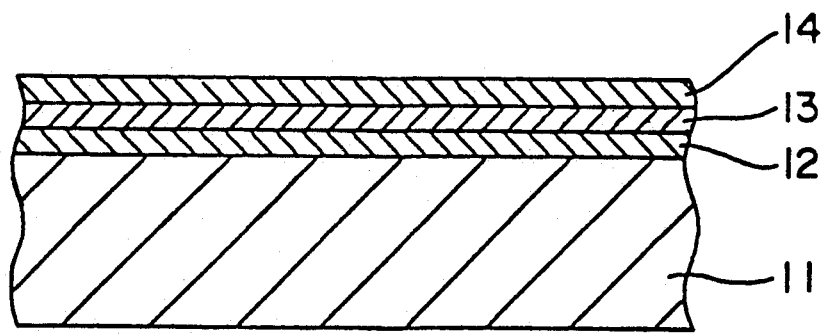
FIG. 1 is a sectional view of one embodiment of the optical information recording medium according to the invention.

The present inventors have earnestly studied to obtain an optical information recording medium showing a high reflectance and having such a layer-structure that layers constituting the medium (e.g., recording layer) can be formed on a substrate by only a coating method, and accomplished the present invention.

The information recording medium of the invention has a basic structure comprising a substrate and three recording layers laminated thereon. An example of structures of the information recording medium according to the invention is shown in FIG. 1 of the attached drawing.

FIG. 1 is a sectional view of an optical disc. The optical disc comprises a substrate 11, a first recording layer 12 made of an organic material, a second recording layer 13 made of an organic material and a third recording layer made of an organic material, superposed in this order.

A surface of the substrate 11 is provided with a pre-groove or provided with a pre-groove and pre-pits. The substrate is preferably made of a plastic material. The refractive index of the substrate generally is approx. 1.6, and the extinction coefficient thereof indicating a degree of light transmission is near 0. On the substrate are provided the three recording layers 12, 13 and 14. Each of the recording layers is made of an organic material. The three recording layers have different refractive indexes and extinction coefficients (real part of a complex refractive index and imaginary part thereof) from each other, but the first recording layer and the third recording layer may have the same ones.

The optical information recording medium of the invention can be prepared using, for example, the following materials.

A material of the substrate employable in the invention can be selected from any materials which have been employed for the substrates of the conventional recording media. Examples of the substrate materials include glasses, acrylic resins (e.g., polymethyl methacrylate), vinyl chloride resins (e.g., polyvinyl chloride and ethylene-vinyl chloride copolymer), epoxy resins, polycarbonate resins, amorphous polyolefins and polyesters. From the viewpoint of optical characteristics, smoothness, workability, handling properties, long-term stability and manufacturing cost, preferred are polycarbonate, amorphous polyolefin and polymethyl methacrylate.

On the substrate, either a pre-groove or a combination of a pre-groove and pre-pits is provided for the purpose of forming a tracking groove or forming protruded and depressed portions which indicate information such as address signals. The pre-pits are generally formed on the inner periphery side of the substrate where the pre-groove is not provided. If the substrate material is plastic, it is preferred to directly provide the pre-groove and the pre-pits on the substrate by means of injection molding, extrusion molding, etc.

The pre-groove and pre-pits can be provided on the substrate by forming a pre-goove layer on the substrate. As a material of the pre-groove layer, there can be employed a mixture of at least one monomer (or oligomer) selected from the group consisting of monoester, diester, triester and tetraester of an acrylic acid and a photopolymerization initiator. The pre-groove layer can be formed on the substrate by the process described below. In the first place, a mixture liquid of an acrylic acid ester and a photopolymerization initiator is coated on a precisely prepared stamper, and on the coated layer of the liquid is placed a substrate. Then, the coated layer is cured under irradiation with ultraviolet rays via the stamper or the substrate so as to fix the substrate to the coated layer. Thereafter, the substrate is separated from the stamper. Thus, a substrate provided with a pre-groove layer can be prepared. The thickness of the pre-groove layer is generally in the range of 0.05 to 100 $\mu$m, preferably in the range of 0.1 to 50 $\mu$m.

The above-mentioned pre groove has such a dimension that the half width is generally in the range of 0.2 to 1.0 $\mu$m, preferably 0.3 to 0.8 $\mu$m, more preferably 0.4 to 0.7 $\mu$m, and the depth is generally in the range of 400 to 4,000 Å, preferably 600 to 3,000 Å, more preferably 600 to 2,000 Å.

On the substrate, a first recording layer is provided.

The first recording layer is made of an organic material (preferably a dye), and has a real part (refractive index) of a complex refractive index and an imaginary part (extinction coefficient) of a complex refractive index satisfying the following conditions (1) and (2):

$$n_{1r} \geq 1.8 \quad (1)$$

$$k_{1r} \leq 0.5 \quad (2)$$

wherein $n_{1r}$ represents a real part (refractive index) of a complex refractive index of the first recording layer at the wavelength of a reproducing laser beam, and $k_{1r}$, represents an imaginary part (extinction coefficient) of a complex refractive index of the first recording layer at the wavelength of a reproducing laser beam.

The conditions (1) and (2) are preferably in the ranges of $12.0 \geq n_{1r} \geq 1.8$ and $0 \leq k_{1r} \leq 0.5$, more preferably in the ranges of $11.0 \geq n_{1r} \geq 2.0$ and $0 \leq k_{1r} \leq 0.3$, and most preferably in the ranges of $10.0 \geq n_{1r} \geq 2.2$ and $0 \leq k_{1r} \leq 0.2$.

The first recording layer has a high refractive index ($n_{1r}$) and a low extinction coefficient ($k_{1r}$). Therefore, a difference between the refractive index of the substrate and that of the first recording layer is large, and a reflectance of approx. 30 to 70% can be generally obtained on the interface between the substrate and the first recording layer. The extinction coefficient ($k_{1r}$) of the first recording layer is low, and almost all lights other than the reflected light transmit the first recording layer.

Further, a particularly high reflectance can be obtained, when the first recording layer further satisfies the following condition (13):

$$n_{1m} + k_{1m} \geq 5.26 \quad (13)$$

wherein, $n_{1m}$ and $k_{1m}$ represent a real part of a complex refractive index of the first recording layer and an imaginary part thereof, respectively, at the maximum absorption wavelength of the first recording layer. Furthermore, it is preferred that the maximum absorption wavelength of the first recording layer is positioned on the shorter wavelength side than the reproducing laser wavelength and the first recording layer satisfies the above condition (13), to obtain high reflectance.

For the first recording layer, dyes generally used for conventional recording layers can be employed, provided that they the above conditions. The organic material of the first recording layer is selected from dyes whose maximum absorption wavelength is generally positioned on the shorter wavelength side than the wavelength of the reproducing laser beam by approx. 50 to 200 nm. Preferred are a cyanine dye, a merocyanine dye, a phthalocyanine dye and a naphthalocyanine dye. Formation of the first recording layer is conducted by coating a coating solution dissolved a dye in a solvent onto the substrate through a coating method such as spin coating to form a first recording layer on the substrate.

The organic material of the first recording layer is selected from dyes whose maximum absorption wavelength is generally positioned on the shorter wavelength side than the wavelength of the reproducing laser beam by approx. 50 to 200 nm. Preferred are a cyanine dye, a merocyanine dye, a phthalocyanine dye and a naphthalocyanine dye.

On the first recording layer, a second recording layer is provided.

The second recording layer is made of an organic material (preferably a polymer), and has a real part (refractive index) of a complex refractive index and an imaginary part (extinction coefficient) of a complex refractive index satisfying the following conditions (3) and (4):

$$n_{2r} < 1.8 \quad (3)$$

$$k_{2r} \leq 0.5 \quad (4)$$

wherein $n_{2r}$ represents a real part of a complex refractive index of the second recording layer at the wavelength of a reproducing laser beam, and $k_{2r}$ represents an imaginary part of a complex refractive index of the second recording layer at the wavelength of a reproducing laser beam.

The conditions (3) and (4) are preferably in the ranges of $1.0 \leq n_{2r} < 1.8$ and $0 \leq k_{2r} \leq 0.5$, more preferably in the ranges of $1.0 \leq n_{2r} \leq 1.7$ and $0 \leq k_{2r} \leq 0.3$, and most preferably in the ranges of $1.0 \leq n_{2r} \leq 1.6$ and $0 \leq k_{2r} \leq 0.1$.

The refractive index ($n_{2r}$) of the second recording layer is low, and a light is a little reflected on the interface between the first recording layer and the second recording layer owing to the difference between the refractive index of the first recording layer and that of the second recording layer. The difference between the refractive index of the first recording layer and that of the second recording layer is preferably not less than 0.5, more preferably not less than 1.0. By making the difference between those refractive indexes large as described above, a light amount of the scattered light constituting the light other than the reflected light, which is unable to be detected in the recording or reproducing procedure, can be made smaller. Since the extinction coefficient ($k_{2r}$) of the second recording layer is low, almost all lights not having been reflected on the second recording layer transmit the second recording layer. This second recording layer corresponds to socalled "an enhancing layer", and when this layer is provided between the first recording layer and the third recording layer, the reflectance of the resulting medium can be enhanced.

Further, in the case of coating a dye solution to an already formed dye layer (recording layer), the dye layer to be coated is apt to swell or be dissolved in the solvent of the dye solution. The second recording layer especially consisting of polymer can prevent the dye layer from swelling or dissolution.

For the second recording layer, polymers or dyes generally used for conventional recording layers can be employed, provided that they the above conditions. Formation of the second recording layer is conducted by coating a coating solution containing polymer in a solvent onto the first recording layer through a coating method such as spin coating to form a second recording layer on the first recording layer.

As the material satisfying the above conditions (3) and (4), there can be mentioned a polymer. Examples of the high molecular compounds include phenol resin, melamine resin, allyl resin, epoxy resin, polyimide, polyvinyl chloride, polyvinylidene chloride, polyvinyl chloride/polyvinyl acetate copolymer, polyvinylidene fluoride, polyethylene, ethylene/vinyl acetate copolymer, ionomer resin, polypropylene, polybutylene, polystyrene, acrylonitile/styrene copolymer, ABS resin, acrylic resin such as polymethyl methacrylate, polyvinyl acetate, polycarbonate, polyacetal, chlorinated polyethylene, chlorinated polyether, polyamide, fluorine-containing resin, polyphenyleneoxide, cellulose acetate resin, cellulose nitrate resin, cellulose butyl acetate resin, polybutadiene, polyacrylonitrile, polyethyleneterephthalate and polybutene.

As a material of the second recording layer, dyes can be also employed. The dye employable for the second recording layer can be selected form dyes whose maximum absorption wavelength is generally positioned on the shorter wavelength side than the wavelength of the reproducing laser beam by approx. 200 nm or whose peak absorption wave length is generally positioned on the longer wavelength side than the wavelength of the recording or reproducing laser beam by approx. 100 nm. Preferred are a cyanine dye, a merocyanine dye, a phthalocyanine dye and a naphthalocyanine dye.

On the second recording layer, a third recording layer is provided.

The third recording layer is made of an organic material (preferably a dye), and has a real part (refractive index) of its complex refractive index and an imaginary part (extinction coefficient) thereof satisfying the following conditions (5) and (6) or the following condition (7):

$$n_{3r} \geq 1.8 \tag{5}$$

$$k_{3r} \leq 0.5 \tag{6}$$

$$k_{3r} \geq 1.0 \tag{7}$$

wherein $n_{3r}$ represents a real part of a complex refractive index of the third recording layer at the wavelength of a reproducing laser beam, and $k_{3r}$ represents an imaginary part of a complex refractive index of the third recording layer at the wavelength of a reproducing laser beam.

The conditions (5) and (6) are preferably in the ranges of $12.0 \geq n_{3r} \geq 1.8$ and $0 \leq k_{3r} \leq 0.5$, more preferably in the ranges of $11.0 \geq n_{3r} \geq 2.0$ and $0 \leq k_{3r} \leq 0.3$, and most preferably in the ranges of $10.0 \geq n_{3r} \geq 2.2$ and $0 \leq k_{3r} \leq 0.2$. These regions are the same as those for the first recording layer.

It is preferred that the third recording layer satisfying the above condition (7) further satisfies the following condition (8) or the following condition (10):

$$n_{3m} + k_{3m} < 5.26 \tag{8}$$

$$n_{3m} + k_{3m} \geq 5.26 \tag{10}$$

wherein $n_{3m}$ and $k_{3m}$ represent a real part of a complex refractive index of the third recording layer and an imaginary part thereof, respectively, at the maximum absorption wavelength of the third recording layer.

It is very effective to use the third recording layer further satisfying the condition (8) in the case that the recording and reproducing properties are especially desired at a high level with keeping a high reflectance. On the other hand, it is very effective to use the third recording layer further satisfying the condition (10) in the case that a high reflectance is specifically desired in a wide wavelength region keeping high recording and reproducing properties.

The third recording layer satisfying the above condition (8) is preferably a layer furthermore satisfying the following condition (9):

$$1 \leq n_{3r} \leq 4 \tag{9}$$

wherein $n_{3r}$ represents a real part of a refractive index of the third recording layer at the wavelength of a reproducing laser beam.

When the third recording layer satisfies the conditions (7) and (8), $n_{3r}$ and $k_{3r}$ of the third recording layer are preferably in the ranges of $4.0 \geq n_{3r} \geq 1.0$ and $1.0 \leq k_{3r} \leq 10$, more preferably in the ranges of $3.5 \geq n_{3r} \geq 1.0$ and $1.2 \leq k_{3r} \leq 8.0$, and most preferably in the ranges of $3.0 \geq n_{3r} \geq 1.0$ and $1.5 \leq k_{3r} \leq 5.0$.

The third recording layer satisfying the above condition (10) preferably is a layer furthermore satisfying the following conditions (11) and (12):

$$k_{3m} \geq 1.0 \tag{11}$$

$$n_{3r} \leq k_{3r} \tag{12}$$

wherein $k_{3m}$, $n_{3r}$, and $k_{3r}$ and have the same meanings as defined above.

When the third recording layer satisfying the above conditions (11) and (12) is provided in the information recording medium, a prominently high reflectance can be obtained in a wide wavelength region.

When the third recording layer satisfies the conditions (7) and (10), $n_{3r}$ and $k_{3r}$ of the third recording layer are preferably in the ranges of $10 \geq n_{3r} \geq 0.5$ and $1.0 \leq k_{3r} \leq 10$, more preferably in the ranges of $7 \geq n_{3r} \geq 1$ and $2 \leq k_{3r} \leq 6$, and preferably in the ranges of $4 \geq n_{3r} \geq 1.5$ and $3 \leq k_{3r} \leq 5$.

The third recording layer is preferably made of a dye, and is either a layer satisfying the conditions (5) and (6) or a layer satisfying the condition (7).

The third recording layer can be also formed in the same manner as described above, that is, a coating solution dissolved a dye in a solvent is coated on the second recording layer by a coating method such as spin coating to form the third recording layer on the second recording layer.

As the organic material satisfying the above conditions (5) and (6), there can be employed substantially the same organic materials as those for the first recording layer.

As the organic material satisfying the above condition (7), preferably employed are dyes whose maximum absorption wavelength is positioned in the vicinity of the wavelength of the recording or reproducing laser beam. Preferred are a cyanine dye, a merocyanine dye, a phthalocyanine dye and a naphthalocyanine dye.

Each of the first, second and third recording layers generally has a thickness of 50 to 10,000 Å, preferably 100 to 10,000 Å, more preferably 400 to 3,000 Å.

The thickness of each recording layer preferably is in the range of 50 to 1,000 Å, more preferably in the range of 100 to 800 Å, when the first recording layer satisfying the above conditions (1) and (2) also satisfies the following condition (13):

$$n_{1m} + k_{1m} \geq 5.26 \quad (13)$$

Likewise, the thickness of each recording layer preferably is in the range of 50 to 1,000 Å, more preferably in the range of 100 to 800 Å, when the third recording layer satisfying the above conditions (5) and (6) also satisfies the above condition (10).

The thickness of each recording layer preferably is in the range of 400 to 10,000 Å, more preferably in the range of 1,000 to 3,000 Å, when the third recording layer satisfying the above condition (7) also satisfies the above conditions (10), (11) and (12).

The refractive index of the third recording layer satisfying the above conditions (5) and (6) is higher than that of the second recording layer, and the light amount of the reflected light obtained on the interface between the second recording layer and the third recording layer is almost equal or more than the light amount of the reflected light obtained on the interface between the substrate and the first recording layer. The reason is that the refractive index of the second recording layer is set to lower than that of the substrate. The difference between the refractive index of the second recording layer and that of the third recording layer is preferably not less than 0.5, more preferably not less than 1.0, as well as the refractive index between the first recording layer and that of the second recording layer. Although the extinction coefficient ($k_{3r}$) of the third recording layer is low, the reflectance thereof is high due to the large difference of the refractive indexes and a light amount of the transmitted light is small.

The third recording layer satisfying the above condition (7) is required to have a high extinction coefficient ($k_{3r}$), although the refractive index ($n_{3r}$) thereof is not always required to be high. In other words, the extinction coefficient thereof is high, so that the laser beam entered from the second recording layer scarcely transmits the third recording layer, and most of the laser beam is reflected on the third recording layer, and hence the third recording layer shows a high reflectance.

The third recording layer satisfying the condition (7) and further satisfying the condition (10) (preferably also satisfying the conditions (11) and (12)) shows a prominently higher reflectance than the third recording layer satisfying only the condition (7). The reason is that the former layer has a high extinction coefficient in a relatively wider wavelength region as compared with the latter layer.

In spite that the optical information recording medium of the invention is a recording medium in which all of the first, second and third recording layers can be formed by a coating method, the medium shows such a high reflectance as obtained in the case of providing a metal reflecting layer or an enhancing layer on a dye recording layer using sputtering or deposition. In more detail, by adopting a structure comprising a first recording layer having a high refractive index and a low extinction coefficient (the first recording layer corresponding to a conventional dye recording layer), a second recording layer having a low refractive index and a very low extinction coefficient (the second recording layer corresponding to a conventional enhancing layer), and a third recording layer having a high refractive index and a low extinction coefficient as well as the first recording layer or having a high extinction coefficient as well as a conventional metal (in this case, the third recording layer corresponding to a conventional reflecting layer), there can be obtained an optical information recording medium having a high reflectance. A reflectance of thus obtained information recording medium is generally not less than 50%, preferably not less than 60%, more preferably not less than 70%. Further, the resulting information recording medium, as far as the refractive indexes and the extinction coefficients of the three recording layers are set within the above-described ranges, never deteriorates in the recording and reproducing properties.

Moreover, the optical information recording medium of the invention can record signals of long pits with extremely small distortion, as compared with a conventional optical disc having a metal reflecting layer on a dye recording layer. In a conventional optical disc having a recording layer and a metal reflecting layer provided with pre-pits, the pre-pit signals cannot be reproduced from the optical disc, if the recording and reflecting layers are provided on both the pre-pit area and the recording area. In the recording medium of the invention, however, the signals of pre-pits can be accurately read out, even in the case of providing on the substrate a recording layer having the same three-layer structure on both the pre-pit area and the recording area. Accordingly, the recording layer can be formed on the pre-pit area and the recording area at the same time, and hence an optical disc having pre-pits can be easily prepared.

Before the provision of the third recording layer, a laminate consisting of the first recording layer and the second recording layer may be further provided on the already-formed second recording layer. If there is no problem as to increase of the number of the preparation process, the provision of the laminate consisting of the first recording layer and the second recording layer may be repeatedly carried out at several times (preferably 2 to 5 times). In this case, a much higher reflectance can be obtained.

As the dyes employable for the first, second and third recording layers, those satisfying the above-described requisites can be appropriately selected from the following dyes.

For example, there can be employed cyanine dyes (e.g., imidazoquinoxaline dyes and indolenine dyes), phthalocyanine dyes, pyrylium dyes, thiopyrylium dyes, azulenium dyes, squarillium dyes, metal complex dyes (e.g., Ni and Cr), naphthoquinone dyes, anthraquinone dyes, indophenol dyes, indoaniline dyes, triphenylmethane dyes, triallyl methane dyes, merocyanine dyes, oxonol dyes, aminium dyes, diimmonium dyes, and nitroso compounds.

Concrete examples of the above dyes are as follows.
i) Cyanine dye

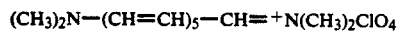  [1]

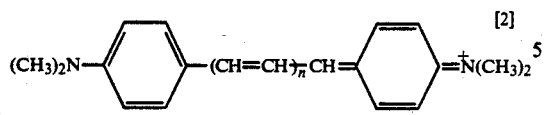  [2]

wherein n is 2 or 3.

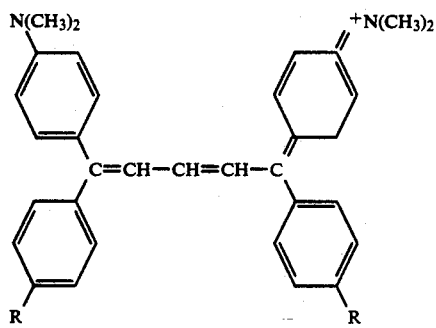  [3]

wherein R is a hydrogen atom or $N(CH_3)_2$.

$$\Phi^+ - L = \Psi(X^{m-})_{1/m} \quad [4]$$

wherein each of $\Phi$ and $\Psi$ is a residue of an indolenine ring, a thiazole ring, an oxazole ring, a selenazole ring, an imidazole ring, a pyridine ring, a thiazolopyrimidine ring or an imidazoquinoxaline ring which may be condensed with an aromatic ring; L is a connecting unit for forming monocarbocyanine, dicarbocyanine, tricarbocyanine or tetracarbocyanine; $X^{m-}$ is a m-valent anion; m is 1 or 2; $X^{m-}$ may be substituted on $\Phi$, L or $\Psi$ to form an inert salt; and $\Phi$ and L or $\Psi$ and L may be linked to each other to form a ring.

Concrete examples of the compounds having the above formulae are the following compounds (CY-1 to CY-48).

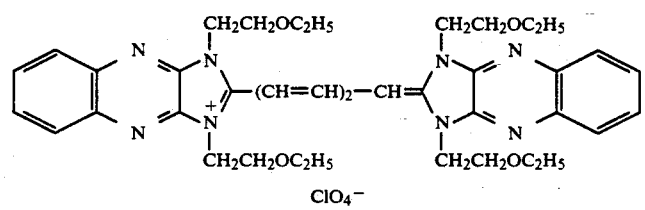

CY-1

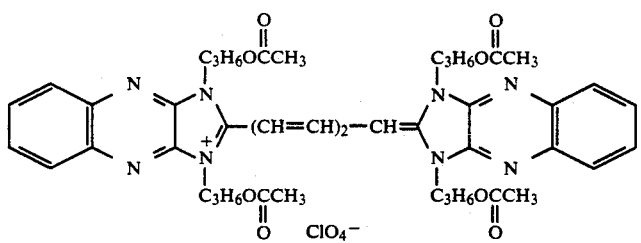

CY-2

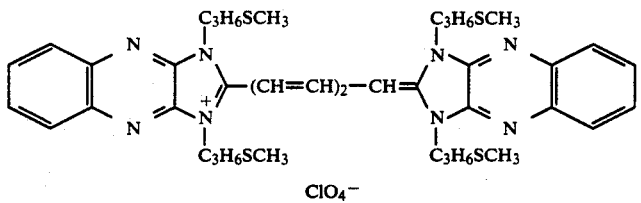

CY-3

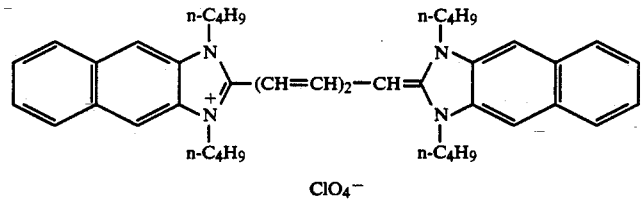

CY-4

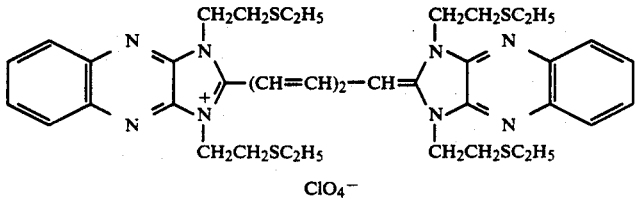

CY-5

-continued
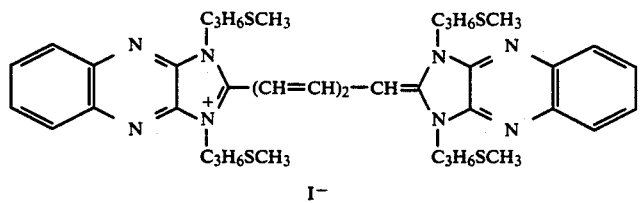
I⁻
CY-6
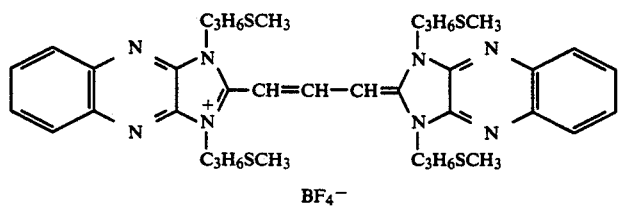
BF₄⁻
CY-7
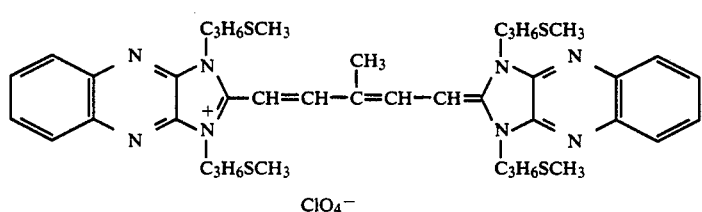
ClO₄⁻
CY-8
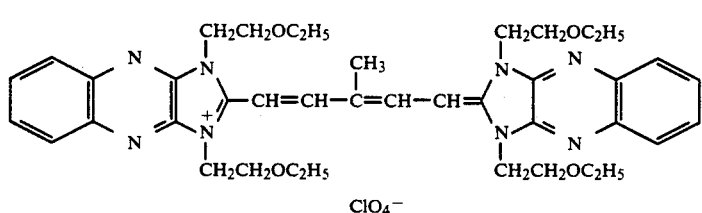
ClO₄⁻
CY-9
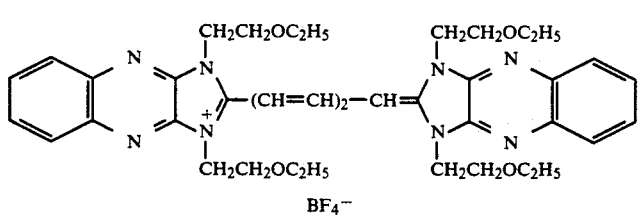
BF₄⁻
CY-10
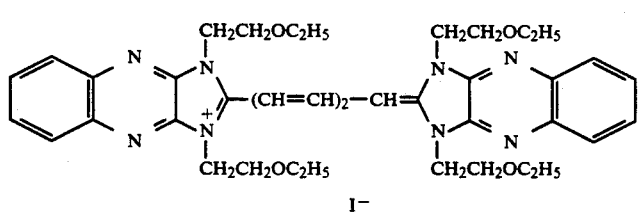
I⁻
CY-11
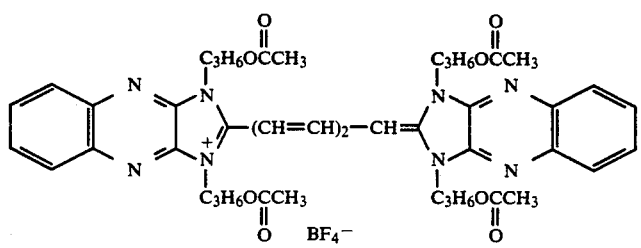
BF₄⁻
CY-12

-continued
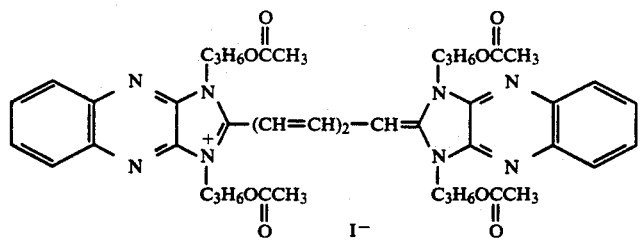
CY-13
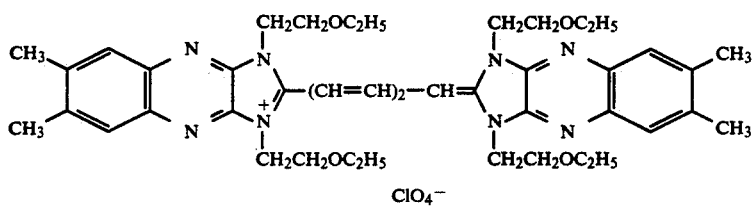
CY-14
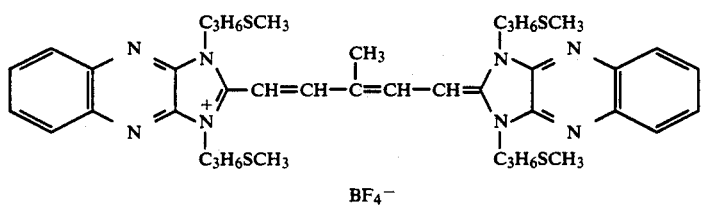
CY-15
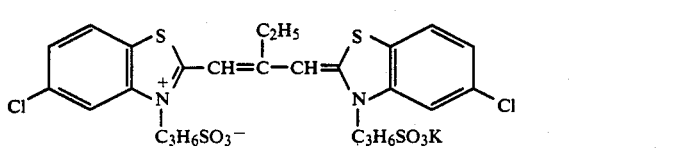
CY-16
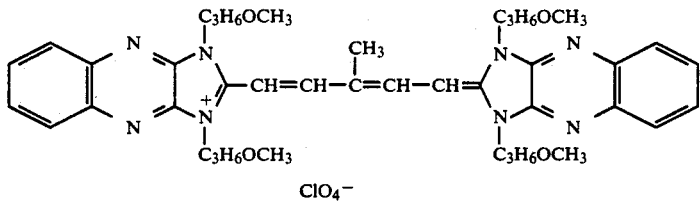
CY-17
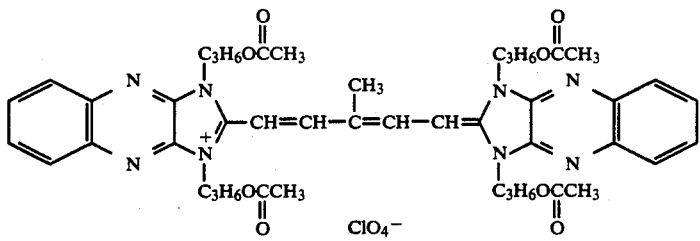
CY-18
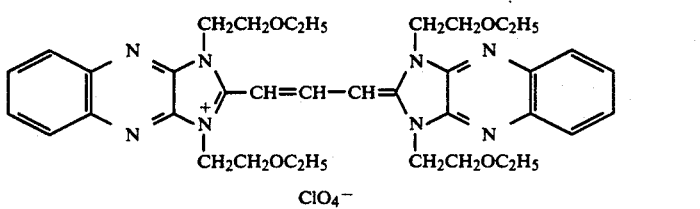
CY-19

-continued
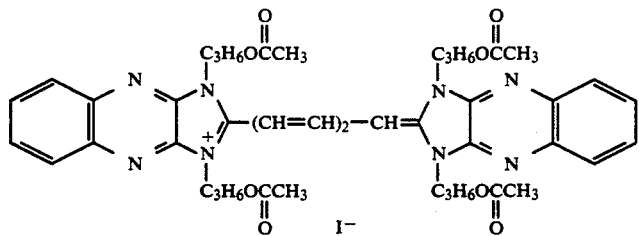
CY-20
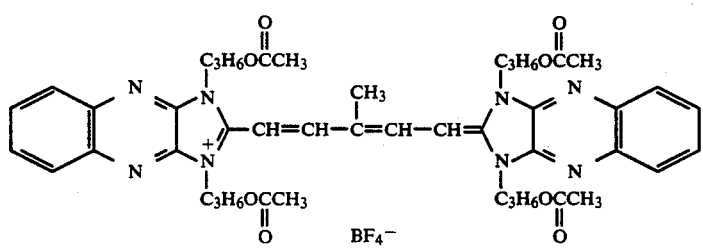
CY-21
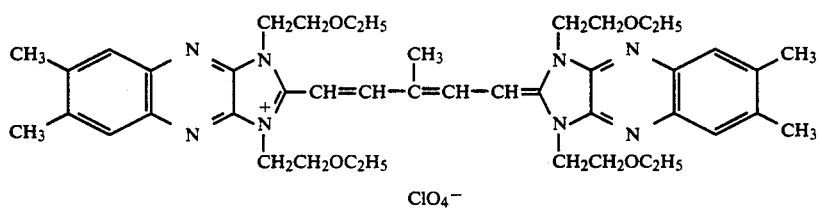
CY-22
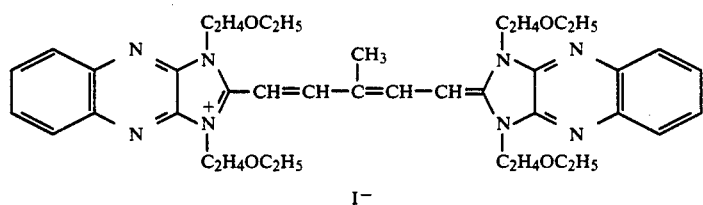
CY-23
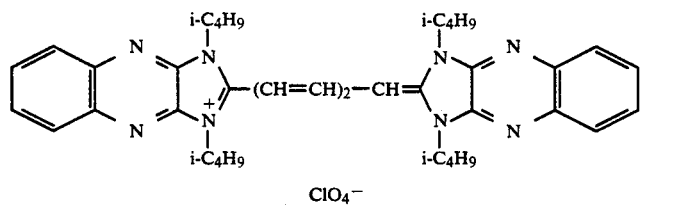
CY-24
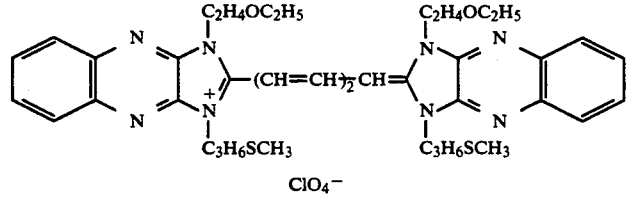
CY-25
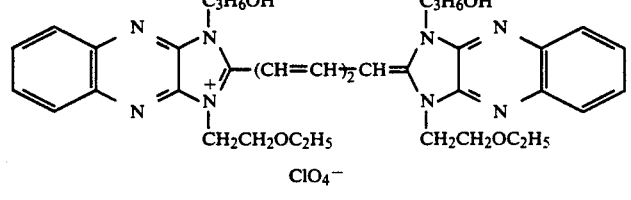
CY-26

-continued
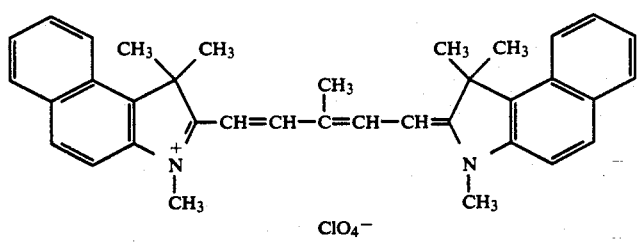
CY-29
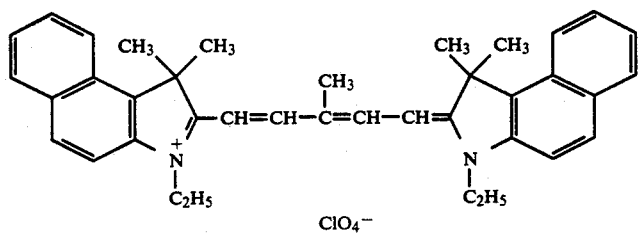
CY-30
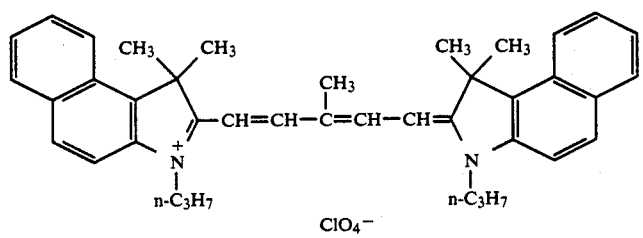
CY-31
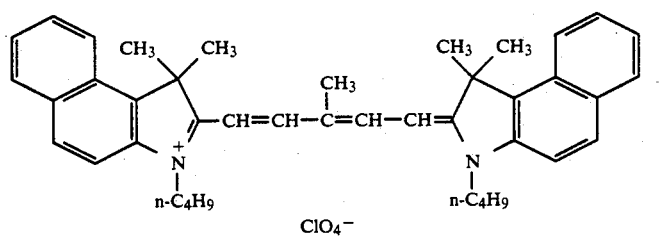
CY-32
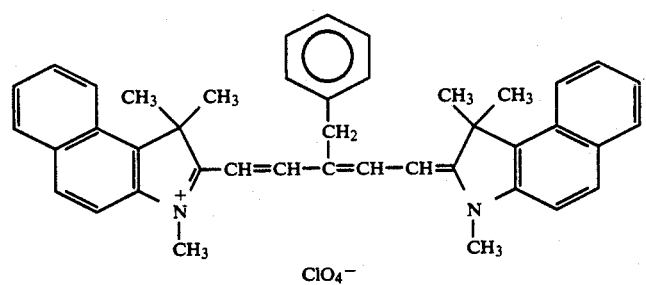
CY-33
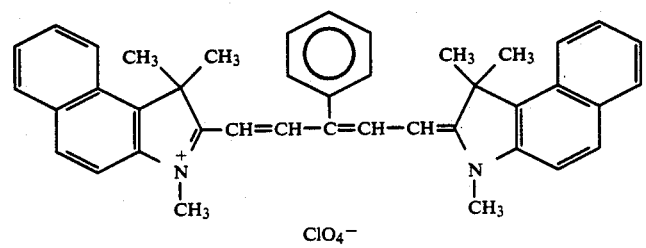
CY-34

-continued
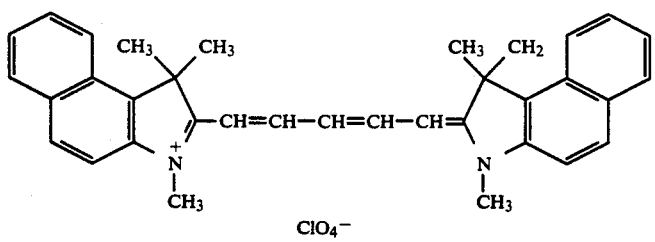
CY-35
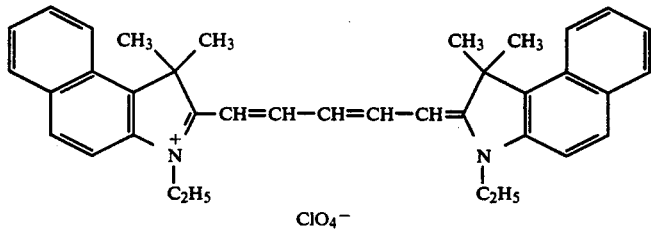
CY-36
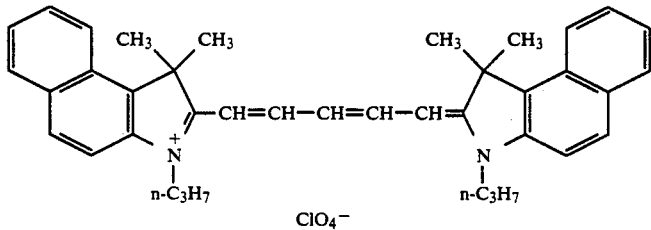
CY-37
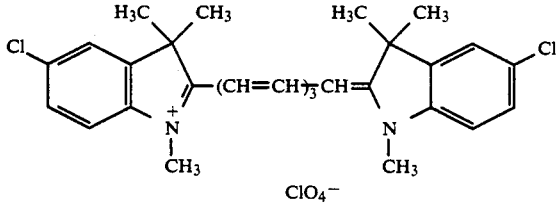
CY-38
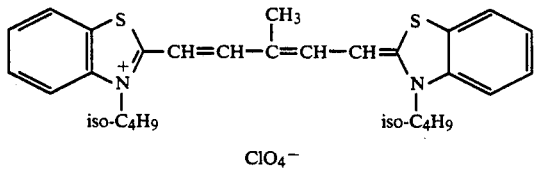
CY-39
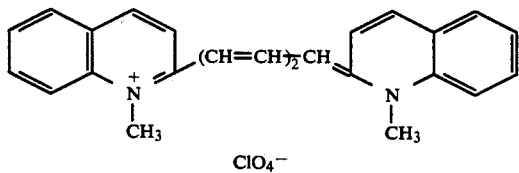
CY-40
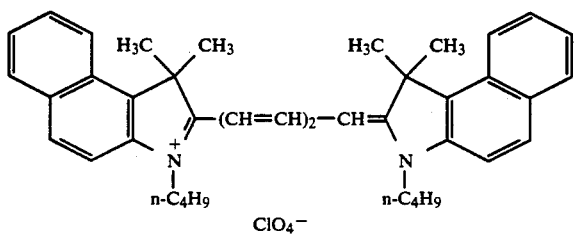
CY-41

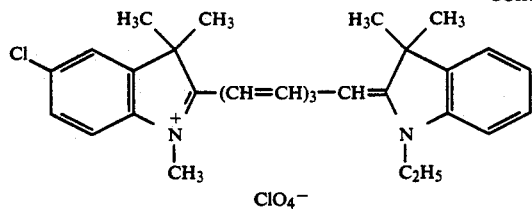
CY-42
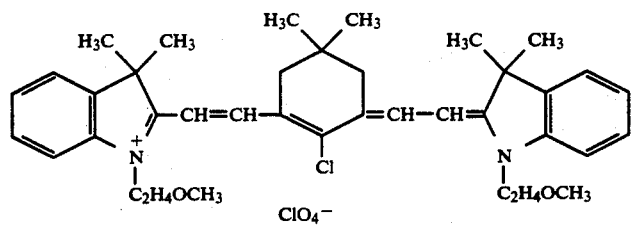
CY-43
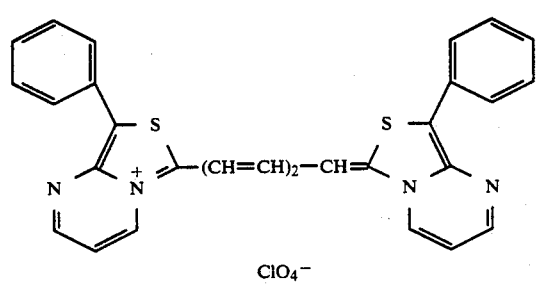
CY-44
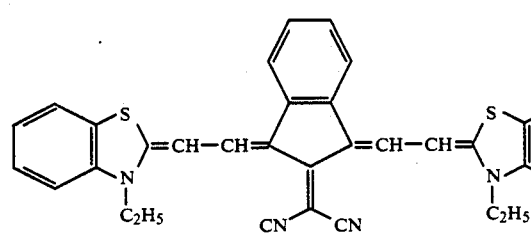
CY-45
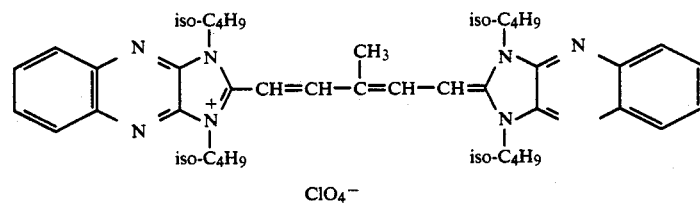
CY-46
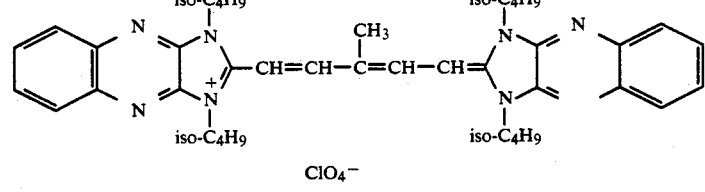
CY-47
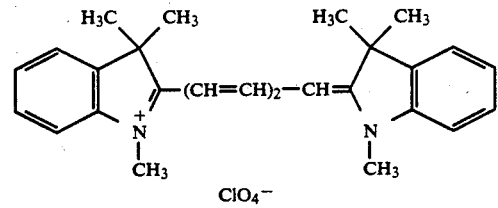
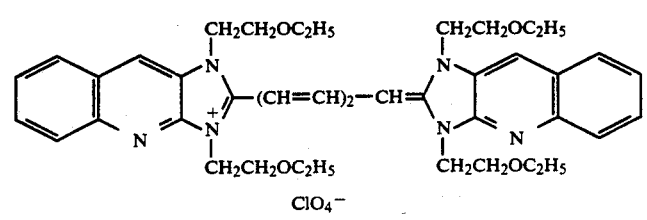
CY-48
ii) Squarillium dye -continued

[5]

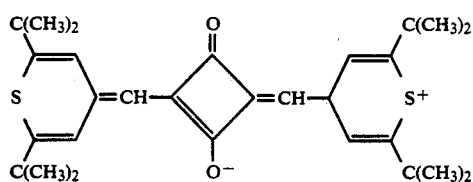

[6]

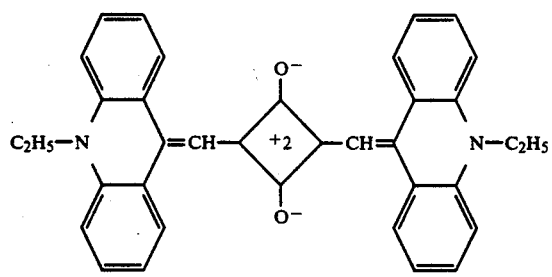

[6b]

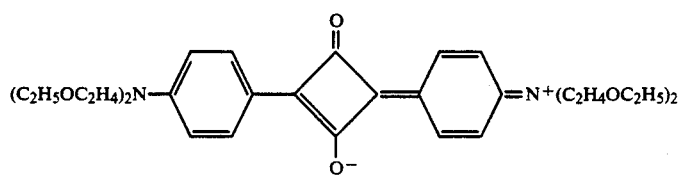

iii) Azulenium dye

[7]

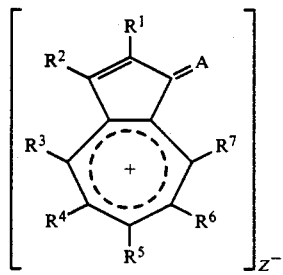

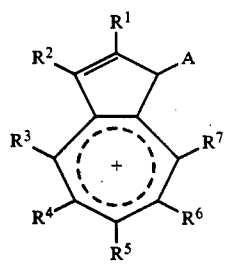

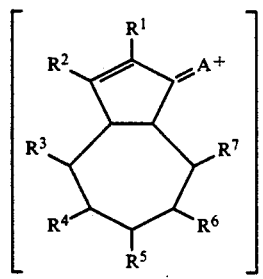

wherein at least one combination among combinations of $R^1$ and $R^2$, $R^2$ and $R^3$, $R^3$ and $R^4$, $R^4$ and $R^5$, $R^5$ and $R^6$ and $R^7$ forms a substituted or unsubstituted heterocyclic or aliphatic ring, and each of $R^1$, $R^2$, $R^3$, $R^4$, $R^5$, $R^6$ and $R^7$ is hydrogen atom, a halogen atom or a monovalent organic residue when they do not form said ring; at least one combination among combinations of $R^1$ and $R^2$, $R^3$ and $R^4$, $R^4$ and $R^5$, $R^5$ and $R^6$, and $R^6$ and $R^7$ may form a substituted or unsubstituted aromatic ring; A is a divalent organic residue bonded through a double bond; Z is an anionic residue; and at least one carbon atom constituting the azulene ring may be substituted with nitrogen atom to form an azazulene ring.

iv) indophenol dye

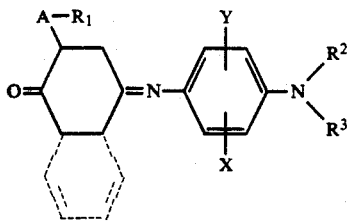

wherein each of X and Y is a hydrogen atom, an alkyl group, an acylamino group, an alkoxy group or a halogen atom; each of $R^1$, $R^2$ and $R^3$ is a hydrogen atom, a substituted or unsubstituted alkyl group, an aryl group, a heterocyclic ring or cyclohexyl group having 1-20 carbon atoms; A is —SH₃NH—, —NCHO— or —CONH—; and this dye molecule may be coordinated with a metal.

v) metal complex salt dye

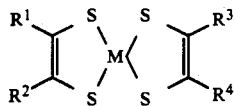                                              [9]

wherein each of $R^1$ to $R^4$ is an alkyl group or an aryl group; and M is a divalent transition metal atom.

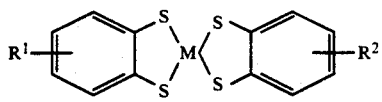                                              [10]

wherein each of $R^1$ and $R^2$ is an alkyl group or a halogen atom; and M is a divalent transition metal atom.

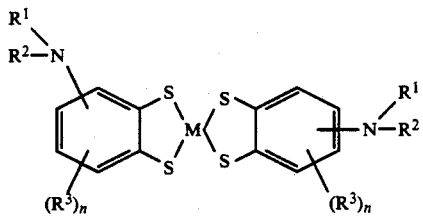                                              [11]

wherein each of $R^1$ and $R^2$ is a substituted or unsubstituted alkyl or aryl group; $R^3$ is an alkyl group, a halogen atom or a group of

(wherein each of $R^4$ and $R^5$ is a substituted or unsubstituted alkyl or aryl group); M is a transition metal atom; and n is an integer of 0 to 3.

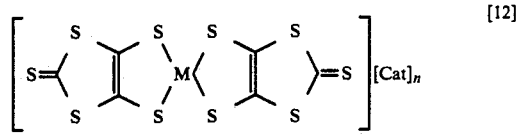                                              [12]

wherein [Cat] is a cation required for formation of a neutralized complex salt; M is Ni, Cu, Co, Pd or Pt; and n is 1 or 2.

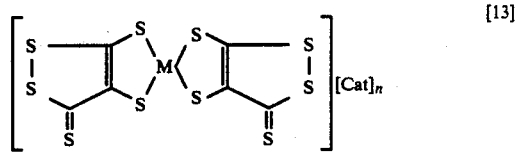                                              [13]

wherein [Cat] is a cation required for formation of a neutralized complex salt; M is Ni, Cu, Co, Pd or Pt; and n is 1 or 2.

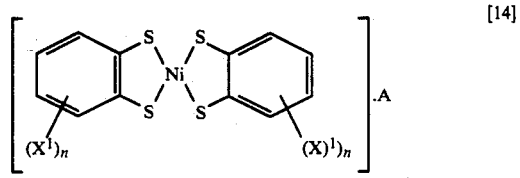                                              [14]

wherein X is a hydrogen atom, a chlorine atom, a bromine atom or a methyl group; n is an integer of 1 to 4; and A is a quaternary ammonium group.

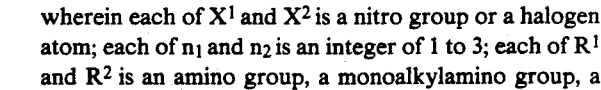                                              [15]

wherein each of $X^1$ and $X^2$ is a nitro group or a halogen atom; each of $n_1$ and $n_2$ is an integer of 1 to 3; each of $R^1$ and $R^2$ is an amino group, a monoalkylamino group, a dialkylamino group, an acetylamino group, a benzoylamino group (including a substituted benzoylamino group); $X^1$ and $X^2$ are the same as or different from each other; $n_1$ and $n_2$ are the same as or different from each other; $R^1$ and $R^2$ are the same as or different from each other; M is Cr or Co; and Y is hydrogen, sodium, potassium, ammonium (including substituted aliphatic ammonium) or an alicyclic ammonium.

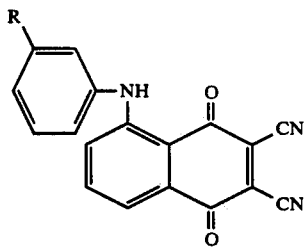

wherein R is a hydrogen atom, an alkyl group, an allyl group, an amino group or a substituted amino group.

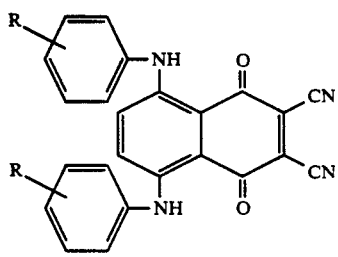

wherein R is a hydrogen atom, an alkyl group, an allyl group, an amino group or a substituted amino group.

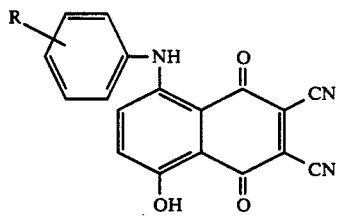

wherein R is a hydrogen atom, an alkyl group, an allyl group, an amino group or a substituted amino group.

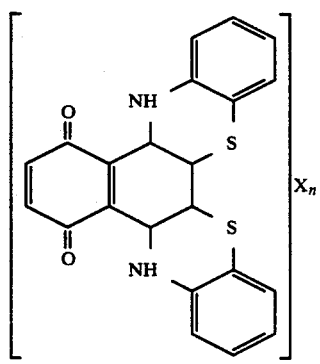

wherein X is a halogen atom; and n is an integer of 0 to 10.

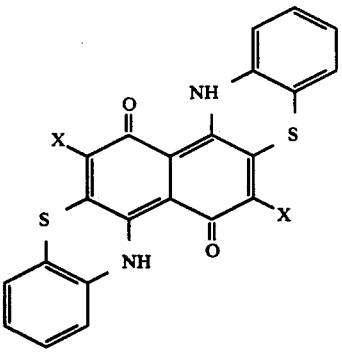

wherein X is a halogen atom.

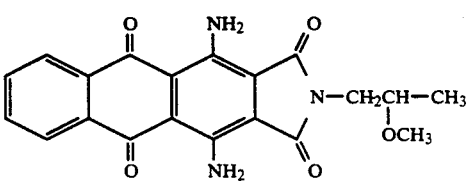

vii) indolidine dye

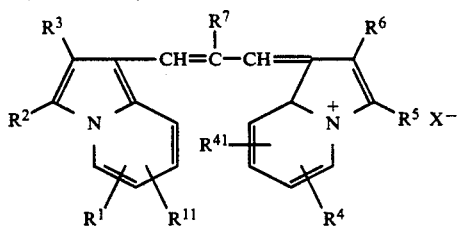

wherein each of $R^1$ and $R^4$ is an alkyl group which may have a substituted group, an aryl group which may have a substituted group, an aralkyl group which may have a substituted group on an aromatic ring, an alkoxy group, an aryloxy group which may have a substituted group on an aromatic ring, an alkylcarbonylamino group, an arylcarbonylamino group which may have a substituted group on an aromatic ring, a cyano group, an acyl group, an alkoxycarbonyl group or a halogen atom; each of $R^{11}$ and $R^{41}$ is a hydrogen atom, an alkyl group which may have a substituted group, an aryl group which may have a substituted group, an aralkyl group which may have a substituted group on an aromatic ring, an alkoxy group, an aryloxy group which may have a substituted group on an aromatic ring, an alkylcarbonylamino group, an arylcarbonylamino group which may have a substituted group on an aromatic ring, a cyano group, an acyl group, an alkoxycarbonyl group or a halogen atom; each of $R^2$, $R^3$, $R^5$, $R^6$ and $R^7$ is a hydrogen atom, an alkyl group which may have a substituted group, an aryl group which may have a substituted group, an aralkyl group which may have a substituted group on an aromatic ring, an alkoxy group or a halogen atom; $R^2$ and $R^3$ together may form a ring when each of them is an alkyl group; $R^5$ and $R^6$ together may form a ring when each of them is an alkyl group; and $X^-$ is anion.

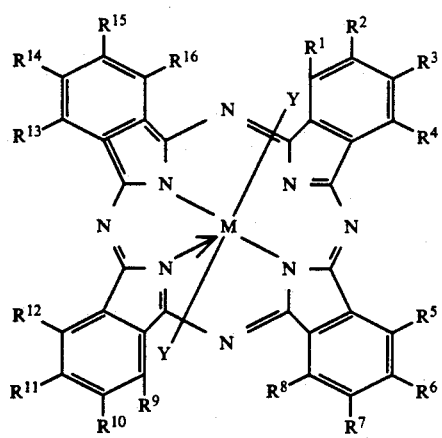

viii)

wherein each of $R^1$ to $R^{16}$ is a hydrogen atom, a halogen atom or a monovalent organic residue; at least one combination $R^k$ and $R^{k+1}$ adjacent to each other (wherein k is an integer of 1 to 15 and k satisfies the condition of $k \neq 4n$ in which n is 1, 2 or 3) may form a substituted or unsubstituted aromatic group; M is Si, Ge or Sn; Y is an aryloxy group, an alkoxy group, a trialkylsiloxyl group, a triarylsiloxy group, a trithyloxy group or an acyloxy group; and Y may be the same as or different from other Y.

Concrete examples of the compounds having the above formulae are the following compounds [23], [24]and [24].

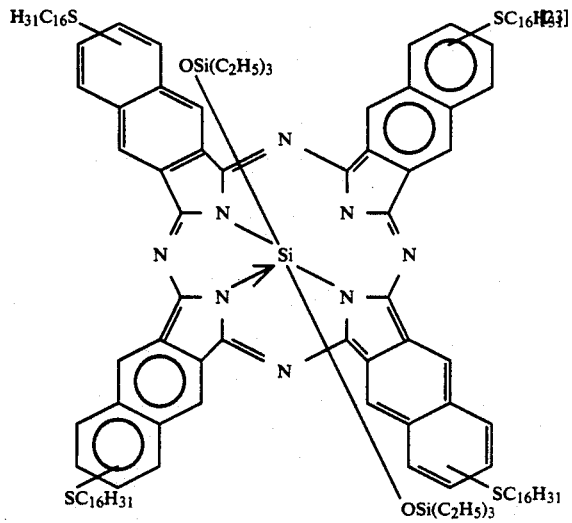

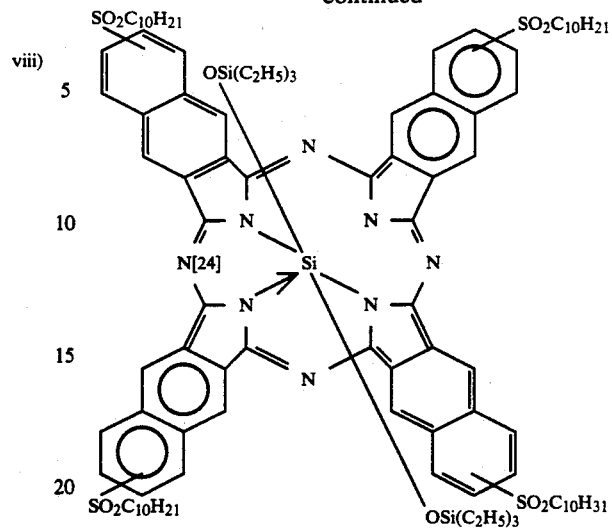

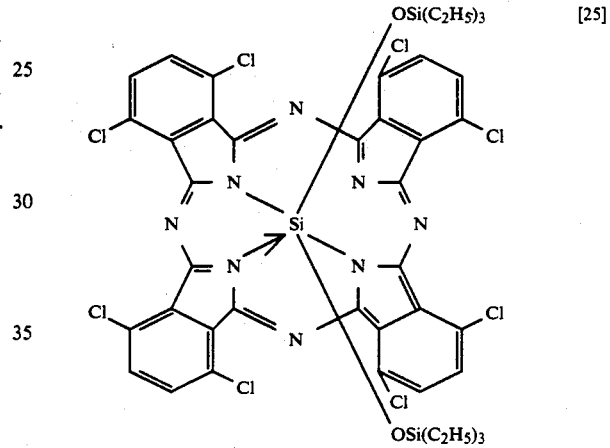

When each of the first recording layer, the second recording layer and the third recording layer is a dye recording layer, they can be formed, for example, as follows. That is, the formation of the dye recording layer can be conducted by dissolving the above-mentioned dye (and a binder, if desired) in a solvent to prepare a coating solution, then coating the solution over the surface of the substrate, and drying the coated layer of the solution.

Examples of the solvents employable for preparing the coating solution (i.e., dye solution) include esters such as ethyl acetate, butyl acetate and cellosolve acetate; ketones such as methyl ethyl ketone, cyclohexanone and methyl isobutyl ketone; halogenated hydrocarbons such as dichloromethane, 1,2-dichloroethane and chloroform; ethers such as tetrahydrofuran, ethyl ether and dioxane; alcohols such as ethanol, n-propanol, isopropanol, n-butanol and diacetone alcohol; amides such as dimethylformamide; and fluorine-containing solvents such as 2,2,3,3-tetrafluoro. propanol. These non-hydrocarbon organic solvents may contain hydrocarbon solvents such as an aliphatic hydrocarbon solvent, an alicyclic hydrocarbon solvent and an aromatic hydrocarbon solvent in an amount of not more than 50% by volume.

The coating solution may further contain various additives such as an antioxidant, a UV-absorbent, a plasticizer and a lubricant according to the purpose.

A binder may be contained in the coating solution. Examples of the binders include natural organic polymer materials such as gelatin, cellulose derivative (e.g., nitrocellulose and cellulose acetate), dextran, rosin and rubber; and synthetic organic polymer materials such as hydrocarbon resins (e.g., polyethylene, polypropylene, polystyrene and polyisobutylene), vinyl resins (e.g., polyvinyl chloride, polyvinylidene chloride and vinyl chloride/vinyl acetate copolymer), acrylic resins (e.g., polymethyl acrylate and polymethyl methacrylate), and pre condensates of thermosetting resins ( e.g., polyvinyl alcohol, chlorinated polyethylene, epoxy resin, butyral resin, polycarbonate, rubber derivative and phenol formaldehyde resin). If desired, a cross-linking agent can be employed in combination with those binders.

The coating solution can be coated on the substrate utilizing conventional coating methods such as spray coating, spin coating, dip coating, roll coating, blade coating, doctor roll coating and screen printing.

In the case of using a binder as a material of the dye recording layer, it is required that the employment of the binder does not cause deviation of the refractive indexes and the extinction coefficients of the first, second and third recording layers from the specific regions of the invention. A ratio of the dye to the binder is generally in the range of 0.01 to 99% by weight, preferably in the range of 1.0 to 95% by weight.

Also in the case of using a polymer as a material of the second recording layer, the above-mentioned solvents and coating methods can be employed to form the second recording layer.

The formation of the three layers of the first, second and third recording layers can be continuously conducted, for example, by fitting three nozzles to a spinner used in a spin coating method and repeating a coating procedure and a drying procedure. Therefore, the recording layers can be very easily formed on the substrate.

On the third recording layer, a reflecting layer may be provided to obtain a prominently high reflectance. In this case, however, the above-mentioned effects of the invention, that is, the medium can be prepared by only a coating process and the pre-its signals can be reproduced, cannot be obtained.

A light-reflecting material employable for the reflecting layer is a material having a high reflectance for a laser beam. Examples of the light-reflecting materials include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and Sb. Of these, Al, Au, Cr and Ni are preferred. These materials can be employed singly or in combination. Alloys thereof can be also employed in the invention.

The reflecting layer can be formed on the third recording layer using the above-mentioned light-reflecting material according to a known method such as deposition, sputtering or ion plating. The thickness of the reflecting layer is generally in the range of 100 to 3,000 Å.

A protective layer may be provided on the third recording layer.

As a material of the protective layer, there can be mentioned inorganic materials such as SiO, $SiO_2$, $Si_3N_4$, $MgF_2$ and $SnO_2$; and organic materials such as thermoplastic resins, thermosetting resins and UV-curable resins. UV-curable resins are most preferred. For obtaining the effects of the invention, the protective layer is preferably formed by coating the above-mentioned organic material on the third recording layer.

The protective layer can be also formed by laminating a plastic film having been obtained by extrusion processing via an adhesive layer. Otherwise, the protective layer can be provided on the third recording layer utilizing vacuum deposition, sputtering, coating, etc. In the case of using a thermoplastic resin or a thermosetting resin, the resin is dissolved in an appropriate solvent to prepare a coating solution, the coating solution is coated over the third recording layer, and the coated layer of the solution is then dried to form a protective layer. In the case of using a UV-curable resin, only the resin or a solution of the resin in an appropriate solvent is coated over the third recording layer, and the coated layer of the solution is irradiated with ultraviolet rays to cure the layer so as to form a protective layer. Examples of UV-curable resins employable in the invention include oligomers of (meth)acrylates such as urethane (meth)acrylate, epoxy (meth)acrylate and polyester (meth)acrylate; monomers of (meth)acrylates; and photopolymerization initiators. The coating solution for the formation of a protective layer may further contain a variety of additives such as an antistatic agent, an antioxidant and a UV-absorbent according to the purpose.

The thickness of the protective layer is generally in the range of 0.1 to 100 $\mu$m. The protective layer may be colored.

The above-mentioned thermoplastic resin, thermosetting resin or UV-curable resin can be employed as one of materials for the third recording layer. In this case, the obtained third recording layer also serves as a protective layer.

In the case of providing a protective layer on the third recording layer, a buffer layer may be further provided on the protective layer to prevent deformation of the recording layer caused by shrinkage of the protective layer. As a material of the buffer layer, there can be employed polymers and metals.

The optical information recording medium (optical disc) of the invention can be protected by covering the disc with a resin film instead of providing a protective layer.

The optical information recording medium of the invention may be a single plate type having the above-described structure, or may be a combined-type in which two substrates having the above-described structure are combined using an adhesive in such a manner that the recording layers are positioned inside to face each other. The recording layer used in the invention can be employed as a reflecting layer (e.g., aluminum reflecting layer) in an optical disc for reproduction of information such as a compact disc.

Recording of information on the optical information recording medium can be made, for example, in the following manner.

In the first place, the optical information recording medium provided with a pre-groove is irradiated with a light for recording information (i.e., recording light) such as a semiconductor laser beam from the substrate side under rotation of the medium at a fixed linear speed (case of CD format signals: 1.2-1.4 m/sec.) or a fixed angle speed, to form pits on the recording layer so as to record signals such as EFM signals of CD format on the recording layer. As the recording light, a semiconductor laser beam having a wavelength region of 500 to 900 nm (preferably 750 to 850 nm) is generally employed.

The information is generally recorded on the information recording medium at a laser power of 1 to 15 mW.

It is presumed that pits are formed on only the third recording layer in the case that the extinction coefficient of the first recording layer is near 0, but in other cases, pits are formed on the first recording layer and further the third recording layer is also deformed. It is also presumed that pit-formation and deformation are brought about also on the second recording layer in the case that the energy of the laser beam is large. When the extinction coefficients of the first and third recording layers are near 0 and a dye is used for the second recording layer, it is possible to record information on the second recording layer. However, it is difficult to record information on only one layer of those layers, and influence on other layers is unavoidable.

In the recording procedure, tracking control is made by means of a push-pull method or the like using the above-mentioned tracking pre-groove. The information is recorded on the grooves of the pre-groove or lands among the grooves.

Reproduction of the recorded information can be carried out by irradiating the recording medium with a semi-conductor laser beam from the substrate side under rotation of the medium at the same fixed linear speed or the same fixed angle speed as described above and detecting the reflected light. The wavelength of the reproducing laser is the same as that of the recording laser. Also in the reproduction procedure, tracking control is made by means of a 3-beam irradiation method or the like.

Examples of the present invention and comparison examples are given below, but these examples by no means restrict the invention.

EXAMPLE 1

Preparation of a coating solution for the formation of a first recording layer 2.25 g of the following dye (aforementioned dye, [CY-41]) was dissolved in 2,2,3,3-tetrafluoropropanol to prepare a 2.25 wt. % coating solution for the formation of a first recording layer.

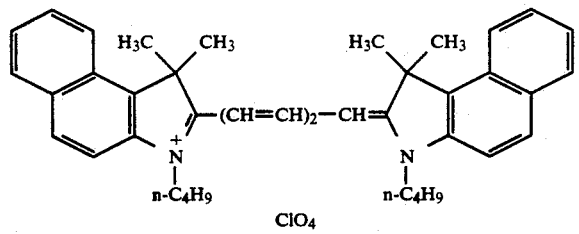

[Dye [CY-41]]

Preparation of a coating solution for the formation of a second recording layer 0.6 g of polybutadiene (tradename: No. 668, available from Scientific Polymer Products Co., Ltd.) was dissolved in a mixture of 15 cc of cyclohexane and 10 cc of n-nonane to prepare a coating solution for the formation of a second recording layer.

Preparation of a coating solution for the formation of a third recording layer

The same coating solution for the formation of a first recording layer was prepared as a coating solution for the formation of a third recording layer.

On a disc-shaped polycarbonate substrate having been provided with a pre-groove (outer diameter: 120 mm, inner diameter: 15 mm, thickness: 1.2 mm, track pitch: 1.6 μm, width of groove: 0.5 μm, depth of groove: 800 Å, area of groove: within a range of 45 mm to 116 mm in diameter) was coated the above-obtained coating solution for the formation of a first recording layer by means of spin coating at 2,000 r.p.m. over 30 seconds to give a coated layer of the solution, and the coated layer was dried to form a first recording layer having a thickness of 900 Å on the substrate.

On the first recording layer was coated the above-obtained coating solution for the formation of a second recording layer by means of spin coating at 1,400 r.p.m. over 30 seconds to give a coated layer of the solution, and the coated layer was dried to form a second recording layer having a thickness of 1,000 Å on the first recording layer.

On the second recording layer was coated the above-obtained coating solution for the formation of a third recording layer by means of spin coating at 2,000 r.p.m. over 30 seconds to give a coated layer of the solution, and the coated layer was dried to form a third recording layer having a thickness of 900 Å on the second recording layer.

The above-mentioned three layers were continuously formed by repeating coating of the solution and drying of the coated solution one after another using a spinner equipped with three nozzles.

Thus, an optical information recording medium consisting of a substrate, a first recording layer, a second recording layer and a third recording layer was prepared. (Ref.: FIG. 1)

EXAMPLE 2

The procedures of Example 1 were repeated except for using the following dye (aforementioned dye, [CY-38]) instead of the dye [CY-41] as a dye using in the preparation of the coating solution for the formation of the third recording layer, to prepare an optical information recording medium.

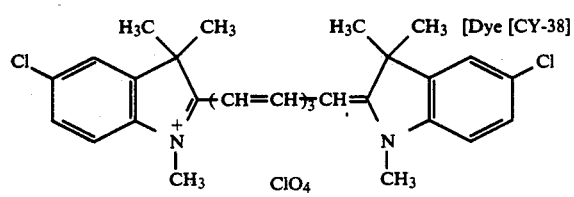

[Dye [CY-38]]

EXAMPLE 3

The procedures of Example 1 were repeated except for varying the dimension of the groove on the substrate surface to that having a width of a groove of 0.65 μm and a depth of a groove of 1,300 Å, to prepare an optical information recording medium.

EXAMPLE 4

The procedures of Example 1 were repeated except for using a substrate provided with pre-pits (width of pit: 0.65 μm, depth of pit: 1,300 Å, area of pit: within a range of 46 mm to 70 mm in diameter) of EFM signals of CD format and pre-groove (width of groove: 0.5 μm, depth of groove: 800 Å, area of groove: within a range of 70 mm to 116 mm in diameter) on its surface as a substrate, to prepare an optical information recording medium.

EXAMPLE 5

The procedures of Example 1 were repeated except for using a substrate provided with pre-pits (width of pit: 0.5 μm, depth of pit: 1,300 Å, area of pit: within a range of 46 mm to 117 mm in diameter) of EFM signals of CD format and pre-groove (width of groove: 0.5 μm, depth of groove: 800 Å, area of groove: within a range of 70 mm to 116 mm in diameter) on its surface as a substrate, to prepare an optical information recording medium.

REFERENCE EXAMPLE 1

The procedures of Example 1 were repeated except for forming the first recording layer on the substrate but not forming the second and third recording layers, to prepare an optical information recording medium.

REFERENCE EXAMPLE 2

The procedures of Example 4 were repeated except for forming the first recording layer on the substrate but not forming the second and third recording layers, to prepare an optical information recording medium.

REFERENCE EXAMPLE 3

The procedures of Example 5 were repeated except for forming the first recording layer on the substrate but not forming the second and third recording layers, to prepare an optical information recording medium.

COMPARISON EXAMPLE 1

The procedures of Example 4 were repeated except for forming the first recording layer on the substrate but not forming the second and third recording layers and forming a reflecting layer having a thickness of 1,000 Å on the first recording layer by depositing Au on the first recording layer through sputtering, to prepare an optical information recording medium.

The polycarbonate substrate and the dye recording layers of the above Examples 1 and 2 were measured on a real part (refractive index) of a complex refractive index and an imaginary part (extinction coefficient) thereof in the following manner.

The polycarbonate substrate was per se measured on its reflectance and transmittance at 780 nm, to determine the refractive index ($n_r$) and the extinction coefficient ($k_r$). As for the dye recording layers, each of the coating solutions for the formation of the first, second and third recording layers was coated on a glass plate in the same manner as described in Example 1, to form a thin layer (having the same thickness as that of Example 1) on the glass plate, and each thin layer was measured on its reflectance and transmittance at 780 nm, to determine the refractive index ($n_r$) and the extinction coefficient ($k_r$).

Further, the refractive index ($n_m$) and extinction coefficient ($k_m$) of each recording layer at the maximum absorption wavelength were determined.

The results are set forth in Table 1.

TABLE 1

| | Recording Layer | Dye/Thickness (angstrom) | $n_r$ | $k_r$ | $n_m$ $k_m$ (nm)* |
|---|---|---|---|---|---|
| Substrate | | Polycarbonate | 1.58 | 0.00 | |
| Example 1 | First | CY-41/900 | 2.60 | 0.06 | 2.08  1.84 (721) |
| | Second | butadiene/1,000 | 1.50 | 0.00 | — — |
| | Third | CY-41/900 | 2.60 | 0.06 | 2.08  1.84 (721) |
| Example 2 | First | CY-41/900 | 2.60 | 0.06 | 2.08  1.84 (721) |
| | Second | butadiene/1,000 | 1.50 | 0.00 | — — |
| | Third | CY-38/900 | 2.10 | 1.80 | 1.96  1.99 (765) |

*Maximum absorption wavelength

Evaluation of Information Recording Medium

1) Reflectance (%) and C/N (dB)

Each of the above-obtained recording media was irradiated with a laser beam of 780 nm under the conditions of a power for recording of a signal (i.e., recording power) of 6 mW, a linear speed of 1.3 m/sec, a modulation frequency of 720 kHz and a duty of 33% using an optical disc-evaluation machine (produced by Pulsteck Industry, Ltd.), to record a signal on each medium. The reflectance of the medium and C/N of the reproduced signal were measured using a spectrum analyzer (trade name: TR 4135, produced by Advantest Co., Ltd.) under the conditions of RBW of 30 kHz, VBW of 100 Hz and a reproducing power of 0.5 mW and a reproducing wavelength of 780 nm.

2) Modulation factor

With respect to 11T pit among the above-mentioned pre-pits of EFM signals of Examples 4 and 5, the intensity of the signal on the signal portion and the non-signal portion (mirror portion) was measured. Using the obtained intensity of the signal, the modulation factor (C) was determined according to the following equation.

$$\text{Modulation factor }(C) = (SH - SL)/SM \times 100$$

wherein SH is a maximum intensity of the signal, SL is a minimum intensity of the signal, and SM is a signal intensity on the mirror portion.

3) Reading of pre-pits

It was tested whether reading of the recorded EFM signals (pre-pits) of CD format was possible or not using a commercially available CD player (tradename: SLP 777, Matsushita Electric Industries, Ltd.).

AA: Reading of pre-pits is possible.
BB: Reading of pre-pits is impossible.

The results are set forth in Table 2.

TABLE 2

| | Reflectance (%) | C/N (dB) | Modulation Factor | Reading of Pre-pit |
|---|---|---|---|---|
| Example 1 | 73 | 51 | — | — |
| Example 2 | 63 | 50 | — | — |
| Example 3 | 73 | 51 | — | — |
| Example 4 | 73 | 51 | 65 | AA |
| Example 5 | 73 | 51 | 60 | AA |
| Ref. Ex. 1 | 42 | 47 | — | — |

TABLE 2-continued

|  | Reflectance (%) | C/N (dB) | Modulation Factor | Reading of Pre-pit |
|---|---|---|---|---|
| Ref. Ex. 2 | 42 | 47 | 22 | — |
| Ref. Ex. 3 | 42 | 47 | 21 | — |
| Com. Ex. 1 | 79 | 51 | 18 | CC |

As is evident from the results set forth in Table 2, the optical discs of Examples 1 to 5 according to the invention each consisting of a substrate, a first recording layer, a second recording layer and a third recording layer showed high reflectance and high C/N. Further, in the case that the EFM signals of CD format were recorded as pre-pits on the recording media of Example 4 and Example 5, the recorded signals were able to be read out from those recording media. Furthermore, even when the signal was a long pit signal of 11T, a high modulation factor was obtained.

On the other hand, the optical discs of Reference Examples 1 to 3, each having only one dye recording layer, showed a low reflectance and had a lower C/N than that of the examples of the invention. In the case that the EFM signals of CD format were recorded as pre-pits on the optical discs (Reference Examples 2 and 3), a high modulation factor was not obtained when the signal was a long pit signal of 11T.

The optical disc of Comparison Example 1 (conventional optical disc) having a metal reflecting layer on a dye recording layer showed a high reflectance, but the signals of pre-pits were unable to be read out from the optical disc.

The following Examples 6 to 8 are examples of an optical information recording medium according to the invention which shows a high reflectance within a particularly wide wavelength region.

EXAMPLE 6

Preparation of a coating solution for the formation of a first recording layer 2.0 g of the following dye (aforementioned dye, [CY-19]) was dissolved in 100 cc of 2,2,3,3-tetrafluoropropanol to prepare a coating solution for the formation of a first recording layer.

Preparation of a coating solution for the formation of a second recording layer

A coating solution for the formation of a second recording layer was prepared in the same manner as described in Example 1.

Preparation of a coating solution for the formation of a third recording layer 2.0 g of the following dye (aforementioned dye, [CY-2]) was dissolved in 100 cc of 2,2,3,3-tetrafluoropropanol to prepare a coating solution for the formation of a third recording layer.

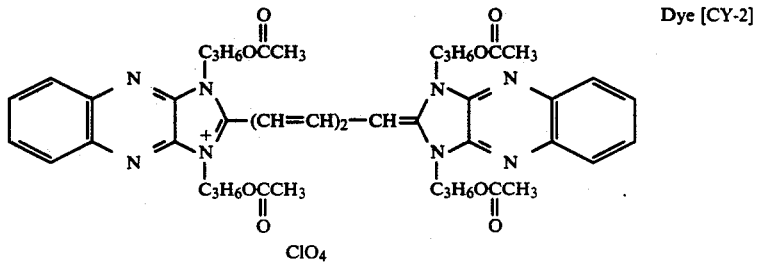

Dye [CY-2]

On the same disc-shaped polycarbonate substrate as used in Example 1 was coated the above-obtained coating solution for the formation of a first recording layer by means of spin coating at 300 r.p.m. to give a coated layer of the solution, and the coated layer was dried at 4,000 r.p.m. over 90 seconds to form a first recording layer having a thickness of 700 Å on the substrate.

On the first recording layer was coated the above-obtained coating solution for the formation of a second recording layer by means of spin coating at 300 r.p.m. to give a coated layer of the solution, and the coated layer was dried at 2,000 r.p.m. over 90 seconds to form a second recording layer having a thickness of 900 Å on the first recording layer.

On the second recording layer was coated the above-obtained coating solution for the formation of a third recording layer by means of spin coating at 300 r.p.m. to give a coated layer of the solution, and the coated layer was dried at 1,500 r.p.m. over 90 seconds to form a third recording layer having a thickness of 1,040 Å on the second recording layer.

The above-mentioned three layers were continuously formed by repeating coating of the solution and drying of the coated solution one after another using a spinner equipped with three nozzles.

Thus, an optical information recording medium consisting of a substrate, a first recording layer, a second recording layer and a third recording layer was prepared. (Ref.: FIG. 1)

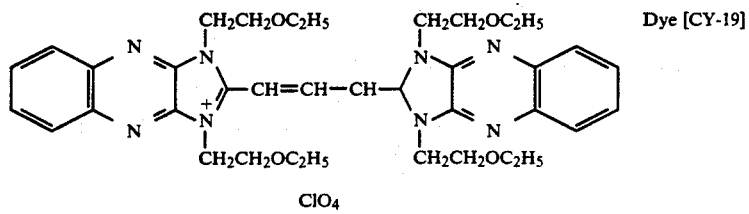

Dye [CY-19]

EXAMPLE 7

The procedures of Example 6 were repeated except for using the aforementioned dye [CY-35] instead of the dye [CY-19] as a dye using in the preparation of a coating solution for the formation of a first recording layer and varying the thickness of the first recording layer from 700 Å to 600 Å, to prepare an optical information recording medium.

EXAMPLE 8

The procedures of Example 6 were repeated except for using 1.0 g of the aforementioned dye [CY-4] instead of 2.0 g of the dye [CY-19] as a dye using in the preparation of a coating solution for the formation of a first recording layer and forming a first recording layer under the following coating conditions, to prepare an optical information recording medium.

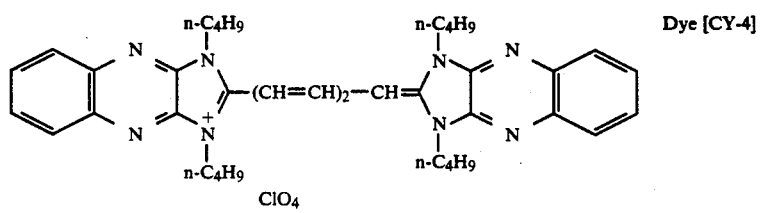

Dye [CY-4]

On the substrate was coated the coating solution for the formation of a first recording layer at 300 r.p.m. to give a coated layer of the solution, and the coated layer was dried at 1,000 r.p.m. over 90 seconds to form a first recording layer having a thickness of 700 Å on the substrate.

The dye recording layers of Examples 6 to 8 were measured on a real part (refractive index) of a complex refractive index and an imaginary part (extinction coefficient) thereof in the following manner.

Each of the coating solutions for the formation of the first, second and third recording layers was coated on a glass plate in the same manner as described in Example 6, to form a thin layer (having the same thickness as that of Example 6) on the glass plate, and each thin layer was measured on its reflectance and transmittance at 780 nm, to determine the refractive index ($n_r$) and the extinction coefficient ($k_r$).

Further, the refractive index ($n_m$) and extinction coefficient ($k_m$) of each recording layer at the maximum absorption wavelength was determined.

The results are set forth in Table 3.

TABLE 3

| | Recording Layer | Dye/Thickness (angstrom) | $n_r$ | $k_r$ | $n_m$ $k_m$ (nm)* |
|---|---|---|---|---|---|
| Example 6 | First | CY-19/700 | 2.61 | 0.02 | 1.77  3.79 (665) |
| | Third | CY-2/1,040 | 0.51 | 2.38 | 2.17  4.27 (813) |
| Example 7 | First | CY-35/600 | 2.79 | 0.06 | 2.30  1.78 (717) |
| | Third | CY-2/1,040 | 0.51 | 2.38 | 2.17  4.27 (813) |
| Example 8 | First | CY-4/600 | 4.70 | 0.10 | 1.31  3.43 (753) |
| | Third | CY-2/1,040 | 0.51 | 2.38 | 2.17  4.27 (813) |

*Maximum absorption wavelength

The values of $n_r$ and $k_r$ of the second recording layer were the same as those of Example 1.

Evaluation of Information Recording Medium

1) Reflectance (%) and C/N (dB)

Each of the above-obtained information recording media was irradiated with a laser beam of 780 nm under the conditions of a power for recording of a signal (i.e., recording power) of 6 mW, a linear speed of 1.3 m/sec, a modulation frequency of 720 kHz and a duty of 33% using an optical disc-evaluation machine (produced by Pulsteck Industry, Ltd.), to record a signal on each medium. The reflectance of the medium and C/N of the reproduced signal were measured using a spectrum analyzer (tradename: TR 4135, produced by Advantest Co., Ltd.) under the conditions of RBW of 30 kHz, VBW of 100 Hz and a reproducing power of 0.5 mW and a reproducing wavelength of 780 nm.

The results are set forth in Table 4.

TABLE 4

| | Reflectance (%) | Range of High Reflectance | C/N (dB) |
|---|---|---|---|
| Example 6 | 75 | 700–850 nm (70% or more) | 52 |
| Example 7 | 71 | 760–860 nm (64% or more) | 52 |
| Example 8 | 69 | 770–860 nm (60% or more) | 52 |

As is evident from the results set forth in Table 3 and Table 4, the optical discs of Examples 6 to 8 according to the invention, each consisting of a substrate, a first recording layer, a second recording layer and a third recording layer, not only showed a high reflectance but also kept the high reflectance within a wide wavelength region. Further, those optical discs showed high C/N.

Accordingly, the optical discs of the invention are presumably applicable to various light drives because they have excellent recording and reproducing properties and show a high reflectance within a wide wavelength region.

We claim:

1. An optical information recording medium comprising a substrate, a first recording layer, a second recording layer and a third recording layer, superposed in this order, wherein:

said first recording layer is a coated layer made of an organic material and satisfies the following conditions (1) and (2):

$$n_{1r} \geqq 1.8 \quad (1)$$

$$k_{1r} \leqq 0.5 \quad (2)$$

said second recording layer is a coated layer made of an organic material and satisfies the following conditions (3) and (4):

$$n_{2r} < 1.8 \quad (3)$$

$$k_{2r} \leq 0.5 \quad (4)$$

and said third recording layer is a coated layer made of an organic material and satisfies the following conditions (5) and (6):

$$n_{3r} \geq 1.8 \quad (5)$$

$$k_{3r} \leq 0.5 \quad (6)$$

wherein $n_{1r}$, $n_{2r}$ and $n_{3r}$ represent a real part of a complex refractive index of the first recording layer, that of the second recording layer and that of the third recording layer, respectively, at the wavelength of a reproducing laser beam; and $k_{1r}$, $k_{2r}$ and $k_{3r}$ represent an imaginary part of a complex refractive index of the first recording layer, that of the second recording layer and that of the third recording layer, respectively, at the wavelength of a reproducing laser beam.

2. The optical information recording medium as claimed in claim 1, wherein a surface of the substrate is provided with a pre-groove and pre-pits.

* * * * *